US 6,687,765 B2

(12) United States Patent
Surugucchi et al.

(10) Patent No.: US 6,687,765 B2
(45) Date of Patent: Feb. 3, 2004

(54) SYSTEM, METHOD, AND COMPUTER PROGRAM FOR EXPLICITLY TUNABLE I/O DEVICE CONTROLLER

(75) Inventors: Krishnakumar Rao Surugucchi, Fremont, CA (US); Bruce M. Cassidy, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 09/764,614

(22) Filed: Jan. 16, 2001

(65) Prior Publication Data

US 2002/0095532 A1 Jul. 18, 2002

(51) Int. Cl.$^7$ ............................................. G06F 13/14
(52) U.S. Cl. .......................................................... 710/15
(58) Field of Search ........................ 710/15; 702/179, 702/182, 183, 184; 700/37

(56) References Cited

U.S. PATENT DOCUMENTS

| | | | | |
|---|---|---|---|---|
| 4,602,326 A | * | 7/1986 | Kraus | 364/158 |
| 4,881,172 A | * | 11/1989 | Miller | 364/424.05 |
| 6,049,439 A | * | 4/2000 | Ono et al. | 360/53 |
| 6,182,022 B1 | * | 1/2001 | Mayle et al. | 702/182 |
| 6,377,907 B1 | * | 4/2002 | Waclawski | 702/182 |
| 6,445,962 B1 | * | 9/2002 | Blevins et al. | 700/37 |
| 6,601,014 B1 | * | 7/2003 | Dempsey | 702/179 |

* cited by examiner

Primary Examiner—Abdelmoniem I Elamin

(74) Attorney, Agent, or Firm—Dorsey & Whitney LLP; R. Michael Ananian

(57) ABSTRACT

Structure, method, and computer program for an explicitly tunable device controller. Method supports high-performance I/O without imposing additional overhead during normal input/output operations. Tuning is performed during explicit pre-I/O operation phase. In one embodiment, invention provides a method for tuning device controller operating characteristics to suit attributes of a data stream in which the method comprises: monitoring a data stream and collecting attributes of the monitored data stream; generating performance metrics of the data stream based on the collected attributes and a plurality of different assumed device controller configurations; comparing expected performance of the plurality of different device controller configurations for effectiveness with a future data stream having similar data stream type attributes to the monitored data stream; and selecting device controller characteristics to provide an effective match between the data stream type and the device controller configuration. In one embodiment, the controller configuration is adjusted automatically and dynamically during normal I/O operations to suit the particular input/output operation encountered. Configuration information may be selected for example, from such parameters as data redundancy level, RAID level, number of drives in a RAID array, memory module size, cache line size, direct I/O or cached I/O mode, read-ahead cache enable or read-ahead cache disable, cache line aging, cache size, or combinations thereof. A storage device controller, such as a RAID controller, implementing the inventive method in computer program software or firmware is also provided as are computer system having a host computer coupled to a storage system through the inventive controller.

24 Claims, 3 Drawing Sheets

EXAMPLE OF A DEVICE CONTROLLER ACCORDING TO AN EMBODIMENT OF THE PRESENT INVENTION

SYSTEM, METHOD, AND COMPUTER PROGRAM FOR EXPLICITLY TUNABLE I/O DEVICE CONTROLLER

FIELD OF THE INVENTION

This invention pertains generally to input/output device performance tuning, and more particularly to a RAID device controller that is explicitly tuned to provide high-performance without imposing significant overhead during normal input/output operations.

BACKGROUND

Modern computers, particularly computers operating in a server environment, benefit from a large, fault-tolerant data storage system. Hard drives in all computer systems are susceptible to failures caused by temperature variations, head crashes, motor failure, controller failure, and changing voltage conditions, among other causes. To improve reliability and protect the data in data storage systems, many data storage systems use a redundant array of independent disks (RAID) operated by a disk array controller. In a RAID storage system, data storage redundancy is achieved by mirroring a copy of the data on one disk drive onto another disk drive (e.g. RAID 1), or by storing the data on a plurality of disk drives along with parity data, that permits the original data on any single drive that may fail to be reconstructed on the basis of the data and parity stored on the remaining disk drives (e.g. RAID 3, RAID 4, RAID 5, as well as other RAID and non-RAID drive systems). RAID storage systems and RAID levels are well known in the art and not described in greater detail here.

Conventional RAID systems typically consist of several individual disk controllers combined with a rack or other physical configuration of drives to provide a fault-tolerant data storage system that is directly attached to a host computer. The host computer is then connected to a network of client computers to provide a large, fault-tolerant pool of storage accessible to all network clients. Typically, the disk array controller provides the brains of the data storage system, servicing all host requests, storing data to multiple drives, such as, for example, RAID drives, caching data for fast access, and handling any drive failures without interrupting host requests.

Caching is a data storage mechanism which is based on the assumption that a data fetch operation to a storage device, such as to a disk drive or RAID storage subsystem, to retrieve one item of data may be followed by a subsequent fetch operation to the same storage device to retrieve a related item of data which may frequently be a data item stored on an adjacent or sequential portion of the storage media of the storage device. Therefore, during the first read operation, not only is the required data item read, but an amount of additional data that is associated with the required data is also read. Typically, the amount of additional data read is determined by the cache memory size, the bandwidth of the communication channel between the storage device (and/or the controller) and the cache, some predetermined amount that is arbitrarily set, or the like factors as are known in the art. For example, when reading a portion of a document for a word processing application, more of the document is retrieved from the hard disk and stored in the cache than is actually required for display to the user at that time, in anticipation that the user may scroll the document and required additional data to be retrieved and displayed. The retrieval of data from the cache, usually a fast electronic Random Access Memory (RAM), is much quicker than retrieval from disk storage. Similar efficiencies may typically be realized when reading program instructions for execution, as many (though not all) instructions will execute or at least be launched in order. Additionally, branches to an instruction, even if remote from the instruction, are often cached in case the branch becomes valid. Therefore, data or other information caching (such as instruction caching) may frequently, though not necessarily always, improve input/output performance. Numerous caching schemes are known in the art and not described in greater detail here.

An input/output profile (I/O profile) of an application or workload is a characterization of the application that typically includes the type and frequency or number of I/O operations for that application. For example, the application may issue several different types of I/O operations including: small random I/O requests, small block size sequential I/O requests, large block size non-sequential I/O requests, and large block size sequential I/O requests. These types are merely examples and not intended to be limiting, as it will be appreciated by those workers having ordinary skill in the art that there may generally be a continuum of block sizes between "small" and "large" and that a "small" block for some data bases or applications may be a "large" block for others.

Typically, the performance accomplished by an I/O controller, such as a RAID controller, and its controlled devices may be heavily dependent on the input/output (I/O) profile of its workload and the configuration or tuning of the controller, particularly relative to the use or non-use of caching. We here consider three exemplary operational I/O situations having different I/O profiles for purposes of illustration. In a workload having predominantly small-block random I/O requests, no particular advantage is gained by employing caching algorithms as random I/O requests will not typically exhibit any hits into the cache. In a workload where random I/O requests predominate, the performance is dependent on the overhead in the controller processing the I/O requests and the speed and number of disk drives attached to it. From the controller standpoint, the overhead is typically a function of the speed of instruction execution of the processor and the efficiency of its algorithms.

By comparison, small-block sequential I/O operations (for example, block sizes between about 512 and about 8K to 16K bytes) may greatly benefit from read-ahead caching because small-block sequential read operations with read-ahead caching tends to minimize the number of requests to the disks or other storage device. Increasing the number of requests to the disks tends to degrade I/O performance, particularly where the number of requests becomes large. In such instances, the use of the read-ahead caching algorithms will result in a significant performance gain over non-caching algorithms as the number of I/O requests to the disks are minimized. However, even for sequential read operations, a non-caching procedure may typically provide better performance than a caching procedure when the block size is large, as in these circumstances the performance is determined primarily by the bandwidth of the internal data paths which limits the overall rate at which data can be moved, rather than being primarily determined by caching.

Therefore, accurately determining the input/output profile of an application or workload, as well as the operational profile of the devices and/or the device controller, and configuring the device and/or device controller to optimize the types of I/O operations can greatly enhance system performance. The benefits may be particularly dramatic when a RAID controller is optimally configured for the I/O profile of the workload or application.

The performance of a RAID controller, usually specified in terms of input/output operations per second (IO/s), bandwidth (MB/s), or I/O completion time, is commercially important to the acceptance and sales of the controller in the marketplace. Competitive performance in state-of-the art RAID controllers has heretofore been achieved through several means. These means include setting various RAID controller and/or controlled device parameters (such as for example, setting or adjusting the RAID stripe size), whether read-ahead caching is enabled or disabled, whether direct I/O or cached I/O is used, whether write-back (WB) or write-through (WT) caching is used, and setting cache aging, cache size and the like.

Measured parameters may, for example, include I/O locality and I/O time. Tuned parameters may include, for example: (i) cached I/O versus direct I/O, and cache size, each of which is a typically a function of locality; (ii) stripe size, which is a function of locality and cache size; (iii) cache line aging, which is a function of locality and time; (iv) write-back caching versus write-through caching, which is a function of locality, time; and (v) WB cache size, which is a function of locality, time, and number of drives. Direct I/O refers to the capability of configurations of the controller in which data is read or written directly from the devices to the system memory through the controller. In such a situation, the data is not placed in any intermediate storage on the controller, such as a cache.

Setting or tuning these parameters in an optimum or near-optimum manner has heretofore required or at least been strongly dependent upon having an intimate knowledge of the expected I/O profile of a given workload by the user, operator, or system administrator. In addition, the system administrator also must have an intimate knowledge of the controller's parameters and their effect on certain I/O properties. Where such intimate knowledge is lacking, parameter tuning usually has followed a trial and error approach at best, where even when a particular set of tuned parameters has been established, there is no way of knowing that those established parameters are optimum or anywhere near optimum.

In some advanced controllers, a limited number of the parameters such as read ahead enable/disable and direct vs. cached I/O are established automatically on a per-I/O basis. By automatically, we mean the controller constantly monitors the I/O stream to determine if the current I/O being processed is part of a sequential stream. In one conventional approach, the read-ahead enable/disable parameter may be adjusted automatically on an I/O-by-I/O or per-I/O basis. Unfortunately, execution of a sequentiality detection procedure (that determines if the current I/O being processed is part of a sequential stream) to select between read-ahead cache enable and read-ahead cache disable on a per-I/O operation basis imposes a significant overhead burden. Thus, while such a controller may exhibit good performance characteristics in different I/O profiles, it may not yield the maximum (or even near maximum) performance possible, for say, a pure (or nearly pure) random I/O stream where the additional overhead may be unacceptably high. This added overhead burden may not be acceptable in other situations as well. For example, it may be unacceptable for a pure random I/O data stream with a high performance requirement, such as would be encountered for a database application. Sequentiality detection can get complicated if there are multiple threads being issued in the I/O stream. This will require the controller to be able to analyze the history of several commands in order to detect sequential streams, thereby further detrimentally increasing the overhead.

Other situations can also increase overhead significantly. Pure random I/O refers to I/O where there is no repeat of an I/O operation to the same or a nearby address within some predetermined amount of time. Random I/O may have few rather than no repeats. In conventional systems and methods, manual tuning procedures directed to random I/O are typically used or tuning is made on a per-I/O basis. For such manual tuning to have any chance of success, there must be knowledge of both the storage subsystem and the application. When tuning is performed on a per-I/O basis, the result is typically a much less responsive storage subsystem. For a random type I/O operation, the overhead imposed by such a automatic detection procedure may be as high as twenty percent.

Furthermore, even where the benefits of automatic detection and adjustment of certain parameters may be desirable or would have some performance benefit, not all RAID parameters are amenable to change using conventional techniques. For example, the RAID stripe size is an important I/O performance parameter, but one that cannot be adjusted using conventional techniques. The RAID stripe size is conventionally set by a configuration utility at the time of creation of the RAID array. In order to change the stripe size after data has been loaded, a data migration operation will have to be performed by the controller. This operation will read data from the devices using the old stripe size and rewrite it using the new stripe size. While such an operation may be performed online, it usually takes on the order of at least a few hours to complete, making it very inconvenient to modify. Alternately, a test operation can also be performed when the actual data is not loaded on the array and the timing procedure recommends a new stripe size, the logical volume can simply be recreated and the actual data can then be reloaded.

Therefore there remains a need for structure, method, and computer program, that provide devices and/or device controllers, including RAID controllers, with performance tuning without the need for intimate user knowledge of the input/output profile or behavior of the device or device controller, and that does not impose significant overhead during normal operation of the system.

SUMMARY

The invention provides structure and method for an explicitly tunable device controller, such as may for example be used in a data storage system of a computer. The inventive structure and method supports high-performance I/O performance without imposing any additional overhead during normal input/output operations. The tuning is performed during explicit pre-I/O operation tuning phase.

In one embodiment, the invention provides a method and procedures for tuning operating characteristics of a device controller to match attributes of a data stream handled by the device controller in which the method comprises: (i) monitoring a data stream and collecting attributes of the monitored data stream; (ii) generating performance metrics of the data stream based on the collected attributes and a plurality of different assumed device controller configurations; (iii) comparing expected performance of the plurality of different device controller configurations for effectiveness with a future data stream having similar data stream type attributes to the monitored data stream; and (iv) selecting device controller characteristics to provide an effective match between the data stream type and the device controller configuration. In a particular embodiment, the controller configuration is adjusted automatically and dynamically during normal input/output operations to suit the particular input/output operation encountered.

Configuration information may be selected, for example, from such configuration parameters as data redundancy level, RAID level, number of drives in a RAID array, memory module size, cache line size, direct I/O or cached I/O mode, read-ahead cache enable or read-ahead cache disable, cache line aging, cache size, and combinations thereof.

A storage device controller, such as a RAID disk array controller, implementing the inventive method in software or firmware is also provided, as are computer systems having a host computer coupled to a storage system through the inventive controller. When the invention is implemented as a procedure executing in a general purpose computer, specialized processor, or other information machine capable of executing computer program instructions, the invention further provides a computer program and a computer program product stored on a tangible media. For example, software, firmware, and/or microcode may be provided in conjunction with a processor and memory of a device controller wherein the firmware within the controller implements the inventive method and procedures.

BRIEF DESCRIPTION OF THE DRAWINGS

The present invention will be explained in the following detailed description and accompanying drawings, in which.

DETAILED DESCRIPTION

The invention will now be described in detail by way of illustrations and examples for purposes of clarity and understanding. It will be readily apparent to those of ordinary skill in the art in light of the teachings of this invention that certain changes in modifications may be made thereto without departing from the spirit or scope of the appended claims. Section headings, where provided in the detailed description, are for convenience and are not to be construed as limiting the disclosure, as various aspects of the invention are described throughout the detailed description.

Figure 1:
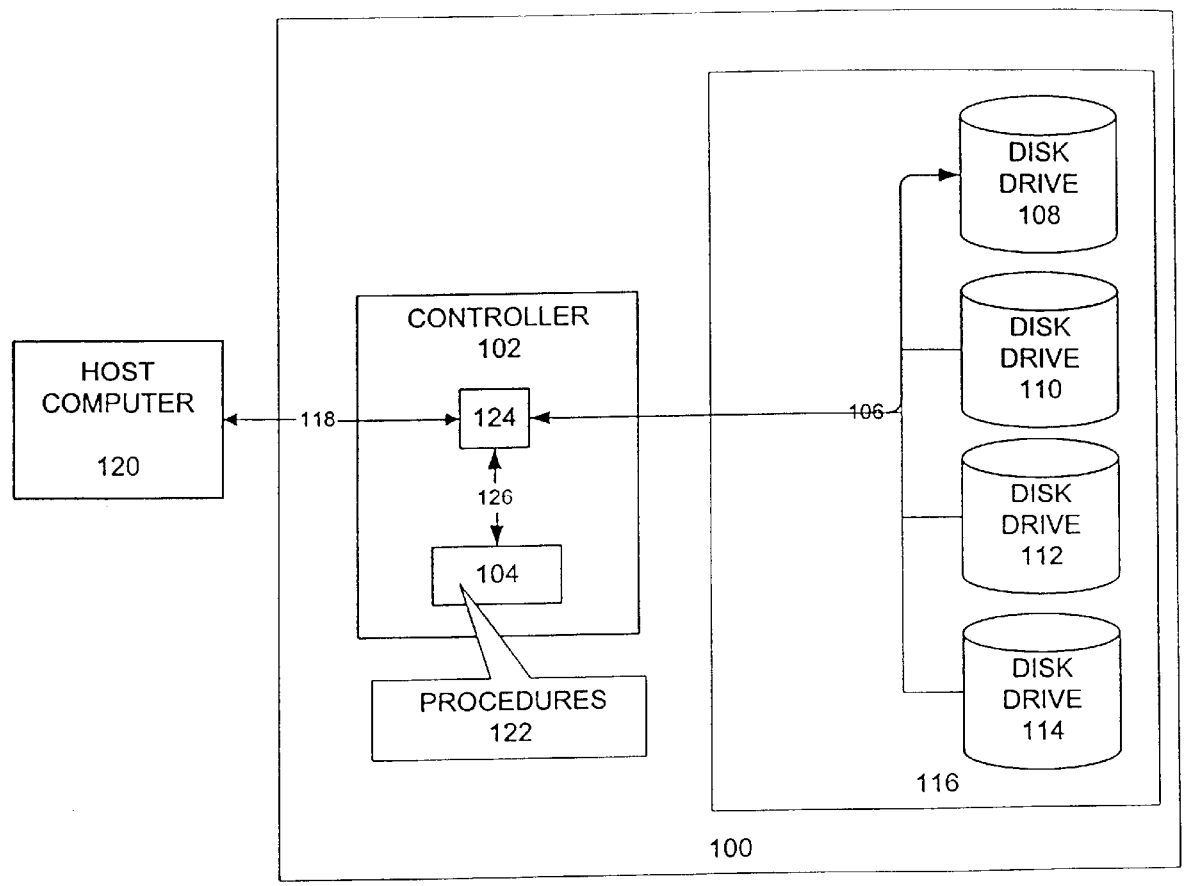
FIG. 1 is a diagrammatic illustration showing an embodiment of a RAID controller as part of a data storage system

Referring to FIG. 1, there is shown a bock diagram illustrating aspects of an exemplary data storage system, according to one embodiment of the present invention. Controller 102 is coupled across I/O bus 106 to a plurality of disk storage devices 108–114 in storage subsystem 116. Controller 102 is also coupled across I/O bus 118 to a host computer 120. I/O bus 106 and I/O bus 118 can each respectively be one of several different types of I/O buses, including, for example, a parallel SCSI bus, an FC-AL bus, a Fibre Channel Fabric bus, a USB bus, or an IEEE 1394 bus. I/O bus 118 may also be a host bus such as a PCI or other conventional bus.

Controller 102 includes processor 124 which is coupled across local bus 126 to memory 104. Local bus 126 can be one of several different types of buses, including, for example, a Peripheral Computer Interconnect (PCI) bus. Memory 104 includes any combination of storage that is internal or external to processor 124 that is addressable by processor 124. For example, memory 104 can be internal cache memory, external random access memory (RAM), or external virtual memory on a hard disk drive (not shown) where virtual addresses are mapped by processor 124 into real addresses.

Controller 102 uses processor 124 to fetch, decode and execute programmed instructions or procedures stored in memory 104. Such programmed instructions and procedures 122 include, for example, pre-IO operation tuning procedure 123, I/O operation type detection procedure 124, dynamic controller adjustment and optimization procedure 125, and overall procedures related to the operation and control of the controller and its interaction with the host computer and with the disk drives in the storage subsystem.

Figure 2:
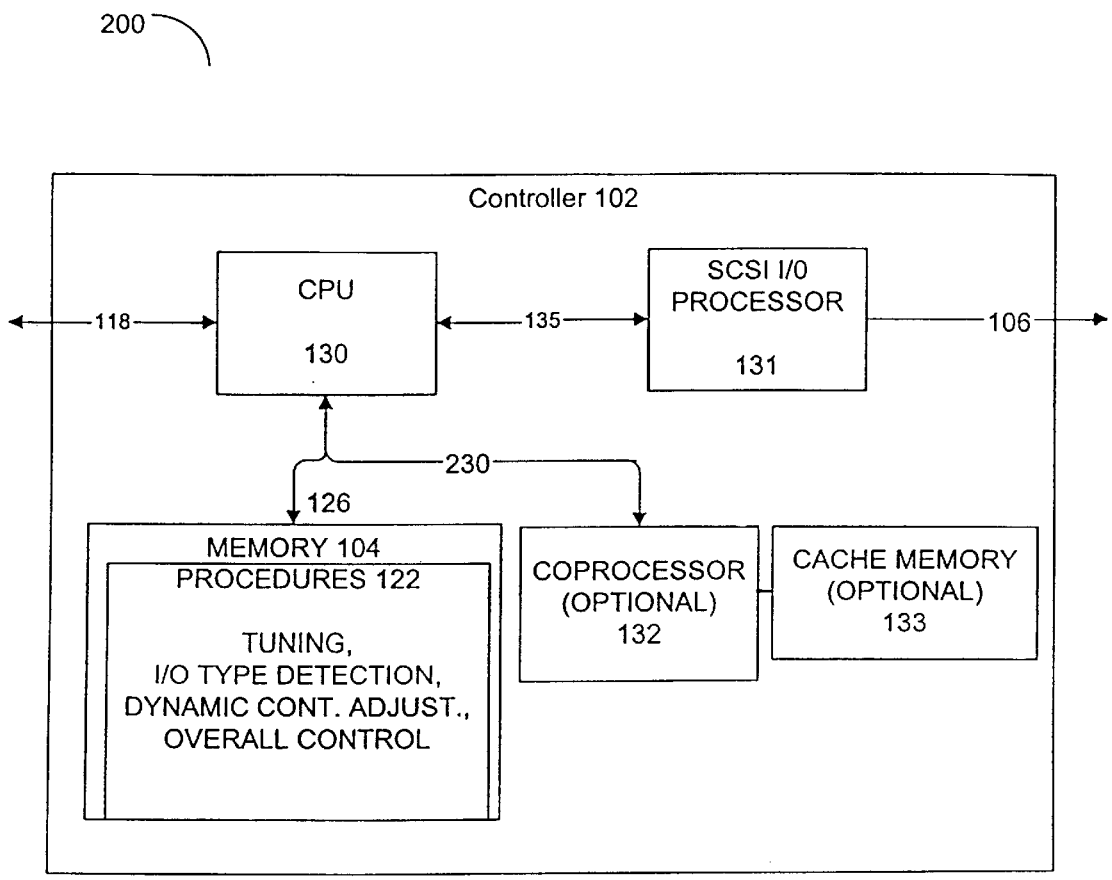
FIG. 2 is a diagrammatic illustration showing an embodiment of a memory and its storage contents for the RAID controller in FIG. 1.
Figure 3:
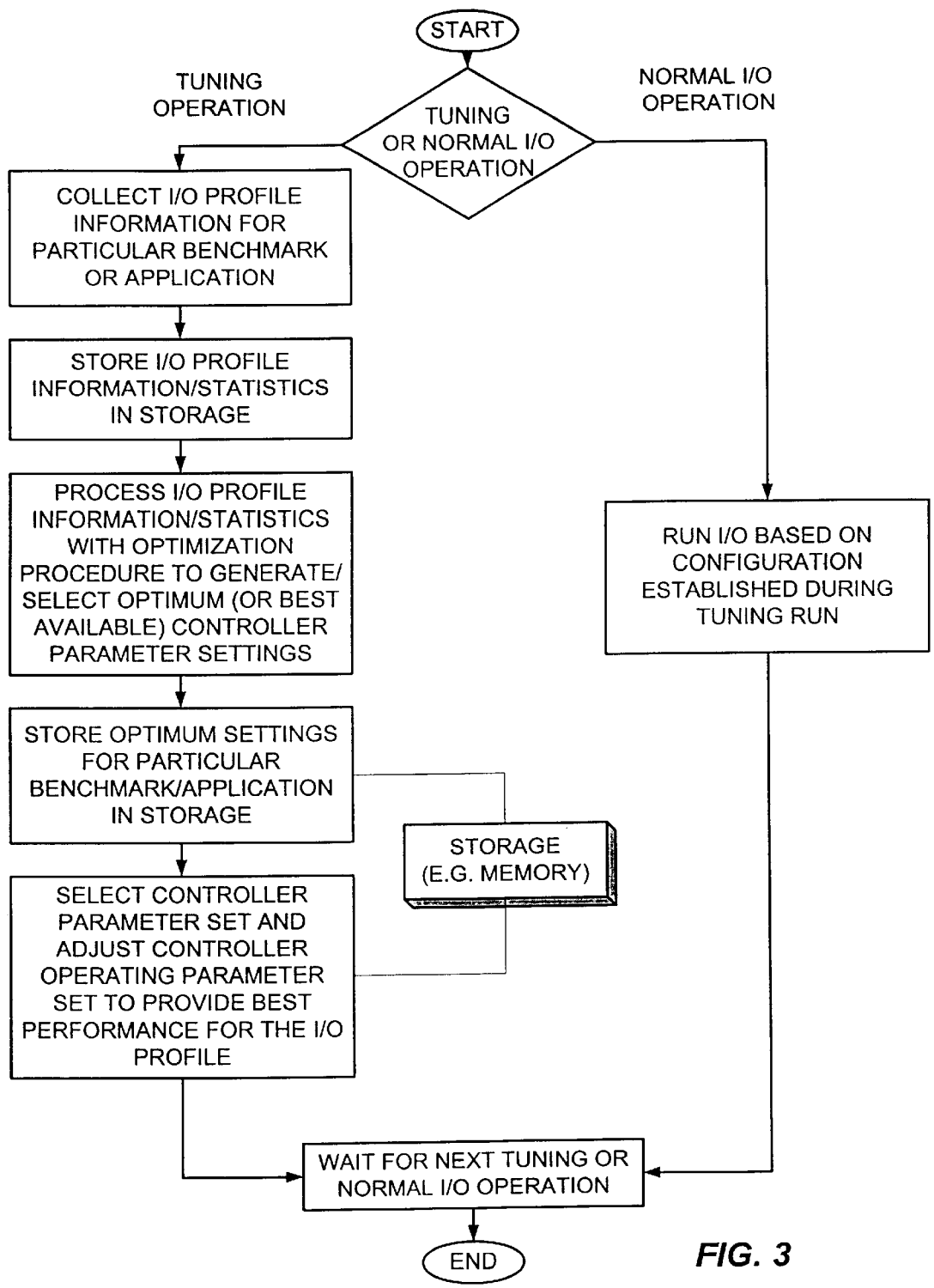
FIG. 3 is a diagrammatic flow-chart illustration showing aspects of an embodiment of a pre-input/output operation tuning procedure.

In FIG. 2 is illustrated an exemplary embodiment of a controller 102 with which the inventive structure, method, and computer program may be used. For example, the inventive procedures 122 (122, 123, 124, 125, . . . ) may be implemented as software or firmware in memory 104 of the controller and executed by CPU or other processor 130. Controller 102 also includes an I/O processor such as SCSI I/O processor 131 for interfacing with the disk drive devices. In one embodiment, the invention is implemented as a firmware customization (enhancements) to: (a) a RAID controller, such as one of the eXtremeRAID™ series of controllers made by Mylex™ of Fremont, Calif., an IBM Company. The CPU 130 may for example be a 32-bit Intel i960 RISC microprocessor with multitasking functionality; memory 104 may be user configurable amount of RAM where user configurable amounts equal from 8 MB of RAM to 256 MB or more of RAM.

The present invention provides structure, method, computer program, and computer program product in the form of software and/or firmware to provide an explicitly self-tunable controller, which in one embodiment is an explicitly self-tunable RAID controller. The inventive controller does not impose any added overhead in analyzing an I/O data stream during its normal operation processing the I/O data stream, that is while handling I/O requests in the course of its normal intended operation. Instead, the controller is explicitly commanded or otherwise instructed to enter a pre-I/O operation tuning mode that precedes the actual run or execution of the benchmark or application for which optimum or at least improved performance is required. While the controller is in the tuning mode, the application or benchmark is run or executed for a predetermined, typically short, duration. Advantageously, the duration of the tuning operation is selected so that the I/O stream characteristics, including any statistical measures that may be made or collected, accurately represent the data stream that would be expected during operation. Benchmarks, where a pre operation tuning procedure would be beneficial, may typically include ones such as TPC-C, TPC-D, Serverbench, or Iometer. Applications where a pre-operation tuning procedure would be beneficial may include for example, but are not limited to, standard applications such as database queries, data mining operations, or specialized applications such as video streaming.

During the tuning operation, the controller determines the nature of the I/O profile for the particular benchmark or particular application, or for a class of benchmarks or class of applications, and adjusts its controller parameters accordingly.

In one embodiment, during each tuning run, the controller collects information on the I/O stream. This information may for example include: (i) request size, (ii) minimum and maximum segment size; (iii) average read/write ratio with minimum and maximum, (iv) percentage of sequential operations, (v) percentage of random operations, and (vi) number of sequential threads, as well as other statistics that may be desired. Various statistical information may also be gathered or computed based on the collected information. For example, standard deviation of the average request size may be is calculated. The collected I/O stream information and statistics are desirably stored in a data structure during collection and used for subsequent analysis. For example, the collected information may be stored a memory of the controller or in some other storage (such as a disk drive) accessible to the controller, and used to construct the look-up table(s), develop the rule set, or provide inputs to the mathematical or statistical algorithms or other computational or comparison procedures described hereinafter. The statistics may for example include: site, locality, read/write ratio, and I/O time. Other information may include, for example, the number of drives in the array and size of physical memory.

In one embodiment of the pre-operation tuning operation, the controller determines the characteristics or attributes of the I/O data stream by capturing the profile of each I/O. These I/O data stream attributes or characteristics are collected and stored as an I/O profile. Controller configuration data used, may for example, include RAID level, number of drives in array, memory module size (expressed for example, in megabytes), and/or other configuration data. The data may be represented for each I/O in the form of a record or records identifying LBA (4 bytes), length (12 bits), R/W (1 bit), time (2 bytes). This format and the number of bits or bytes is merely exemplary and numerous alternative ordering and number of bits or bytes may be used.

The data (I/O profile) is analyzed for various configuration and caching options so as to maximize the probability that a system read will find the result in cache or a system write will only result in an update of cache. Once that is completed, the configuration is compared to one that does no caching so as to determine which will provide the best performance. The I/O profile is also analyzed for I/O size and I/O alignment so that the configuration stripe size can be set.

In the preferred embodiment, a RAID controller collects the data, analyzes the data, and changes its configuration in accordance with the analysis. Rules and algorithms are provided within the analysis to guide the analysis and to arrive at the best configuration. Alternatively, applications and utility programs may be implemented and executed on the host computer that may either be used as a guide to a better or best controller configuration, or the configuration can be downloaded to the controller. This may offer some additional processing power where the processor within the host has significantly greater capability than that in the controller; however, normally the processor for the controller will be selected to have sufficient processing power and associated memory to provide the desired features.

When the benchmark or application for which the controller has been tuned is subsequently run with actual data such as when I/O operations occur during normal operation of the system, reference is made to the stored optimum parameter set identified for the I/O profile of that benchmark or application (or classes of benchmarks or applications) during its tuning run, and these parameters are used to provide optimum or near-optimum performance during normal operation. The inventive method relieves the user from having to understand the I/O profile for the given benchmark or application, and from having to attempt to optimize performance using trial and error or other techniques.

The inventive method then uses the information obtained during tuning to set the various operating parameters such as for example, cache line size, direct I/O or cached I/O mode, read-ahead cache enable or read-ahead cache disable, cache line aging, cache size and the like. In one embodiment, the inventive method then employs a look-up table (LUT) scheme that uses the statistics to determine the operating parameter settings. Once the controller has determined the optimum set of settings for the particular benchmark or application, it adjusts its settings automatically and dynamically during normal I/O operations to suit the I/O operation at hand. Other embodiments utilize the collected I/O profile in conjunction with other schemes, such as for example, predetermined rules or mathematical equation based and/or statistically based algorithms or procedures that determine an optimum (or at least best available) set of controller operating parameters based on the inputs, artificial intelligence techniques and procedures, or other techniques and procedures to determine the best (or best available from which to choose) performance settings.

It is noted that generally the scheme will be implemented as a computer program executing on a processor in association with memory, such as within the host or on the controller itself, however, the optimum set of controller parameters may be determined separately and external from the controller and/or host after the tuning data has been collected and then reloaded into the controller. This later approach is acceptable but generally not preferred as it reduces the ability of the system operator to tune the controller for new and different I/O data stream in the future.

The values in the look-up table may be determined though any means, such as for example by using analytical techniques, statistical analysis, historical indicia, predetermined sets of rules, or even trial-and-error techniques. Likewise, the rules or procedures applied if mathematically or statistically based techniques are used to determine the values, may derived in any manner. Hence, even though some trial-and-error methods may occasionally be used where other analytical tools or techniques may be inadequate, these trial-and-error optimizations need only be performed during the design or configuration of the controller or the creation of the lookup table, and not by users or systems administrators who require optimum performance.

In one embodiment, this procedure for recognizing the characteristics of the data stream and matching sensed or detected characteristics with one of the stored sets of configuration data or parameters includes the steps of: (i) collecting or otherwise generating data characterizing the input and/or output data stream (I/O data stream), (ii) accumulating or otherwise generating statistics relative to input/output stream based on different configuration assumptions or scenarios, (iii) comparing possible configurations for effectiveness, (iv) selecting controller parameters to provide a good match between the data stream and the configuration, and (iv) changing controller parameters in accordance with the selection.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. All patents and publications referenced herein are hereby incorporated by reference.

What is claimed is:

1. A method for tuning operating characteristics of a device controller to match attributes of a data stream handled by said device controller; said method comprising:
   (i) monitoring a data stream and collecting attributes of said monitored data stream;
   (ii) generating performance metrics of the data stream based on said collected attributes and a plurality of different assumed device controller configurations;
   (iii) comparing expected performance of said plurality of different device controller configurations for effectiveness with a future data stream having similar data stream type attributes to said monitored data stream; and
   (iv) selecting device controller characteristics to provide an effective match between said data stream type and said device controller configuration.

2. The method in claim 1, wherein said monitoring, generating, comparing, and selecting are performed in a tuning procedure on a test sample data stream prior to handling an actual data stream.

3. The method in claim 1, wherein said collected attributes comprise statistical attributes of said data stream.

4. The method in claim 3, wherein said statistical attributes are selected from the set of attributes consisting of: (i) average request size, (ii) standard deviation of the average request size, (iii) minimum and maximum segment size, (iv) average read/write ratio with minimum and maximum, (v) percentage of sequential operations, (vi) percentage of random operations, (vii) number of sequential threads, and combinations thereof.

5. The method in claim 3, wherein said collected data stream attributes are stored in a data structure and used in an analysis performed subsequent to said collection.

6. The method in claim 5, wherein said data structure is defined in a memory of said device controller.

7. The method in claim 5, wherein said data structure is defined in a storage device accessible to said device controller.

8. The method in claim 5, further comprising constructing a data structure for associating groups of data stream attributes with particular sets of device controller characteristics.

9. The method in claim 8, wherein said data structure comprises a look-up-table.

10. The method in claim 3, wherein said statistical attributes are selected from the set consisting of: site, locality, read/write ratio, and I/O data stream time.

11. The method in claim 1, wherein said configuration information is selected from the set consisting of data redundancy level, RAID level, number of drives in a RAID array, memory module size, cache line size, direct I/O or cached I/O mode, read-ahead cache enable or read-ahead cache disable, cache line aging, cache size, and combinations thereof.

12. The method in claim 3 wherein said statistical attributes are represented for any particular data stream as records identifying the LBA, length, read or write, and time.

13. The method in claim 1, further comprising analyzing said data stream attributes for device controller configuration and alternative data caching options to identify a configuration with caching so as to improve the probability that a read data operation will find the result in cache or a data write operation will only result in an update of cache.

14. The method in claim 13, wherein said method further comprises comparing said configuration with caching to a non-caching configuration and selecting the best configuration between the caching and non-caching configurations.

15. The method in claim 14, wherein said data steam is an input/output (I/O) data stream associated with a RAID storage system, and said method further comprising analyzing the data stream I/O profile for I/O size and I/O alignment so that the configuration RAID stripe size can be set according to predetermined rules.

16. The method in claim 1, wherein said device controller comprises a RAID controller, and said data stream comprises an input/output data stream for said RAID.

17. The method in claim 1, wherein said device controller comprises a plurality of device controllers and said selected configuration is implemented for said plurality of device controllers.

18. The method in claim 1, wherein said controller configuration is adjusted automatically and dynamically during normal input/output operations to suit the particular input/output operation encountered.

19. A method for tuning operating characteristics of a RAID storage device controller to match attributes of an input/output (I/O) data stream handled by said RAID storage device controller; said method comprising:
   collecting data for an I/O data stream;
   constructing an I/O profile for said collected data; generating performance measures for the I/O data stream based on said I/O profile and a plurality of different assumed RAID device controller configurations;
   comparing performance of said plurality of different RAID device controller configurations for effectiveness with an I/O data stream having comparable I/O profile; and
   selecting RAID device controller characteristics to provide an effective match between said RAID device controller configuration and I/O data streams having said comparable I/O profiles.

20. The method in claim 19, wherein I/O profiles are identified as comparable when they have data stream attributes within predefined ranges from a nominal range.

21. The method in claim 19, wherein said controller configuration is adjusted automatically and dynamically during normal input/output operations to suit the particular input/output operation encountered.

22. A computer program for tuning operating characteristics of a device controller to provide an effective match with expected input/output data stream attributes, said computer program including a program module having instructions for:
   (i) monitoring a data stream and collecting attributes of said monitored data stream;
   (ii) generating performance metrics of the data stream based on said collected attributes and a plurality of different assumed device controller configurations;
   (iii) comparing expected performance of said plurality of different device controller configurations for effectiveness with a future data stream having similar data stream type attributes to said monitored data stream;
   (iv) selecting device controller characteristics to provide an effective match between said data stream type and said device controller configuration; and
   (v) configuring said controller according to said selected device controller characteristics.

23. The computer program in claim 22, wherein said controller configuration is adjusted automatically and dynamically during normal input/output operations to suit the particular input/output operation encountered.

24. A computer program product for tuning operating characteristics of a device controller to provide an effective match with expected input/output data stream attributes, the computer program product for use in conjunction with a computer system, the computer program product comprising a computer readable storage medium and a computer program mechanism embedded therein, the computer program mechanism comprising:

- a monitoring component monitoring a data stream and collecting attributes of said monitored data stream;
- an analysis component generating performance metrics of the data stream based on said collected attributes and a plurality of different assumed device controller configurations;
- a comparison component comparing expected performance of said plurality of different device controller configurations for effectiveness with a future data stream having similar data stream type attributes to said monitored data stream;
- a selection component selecting device controller characteristics to provide an effective match between said data stream type and said device controller configuration; and
- a controller configuration component configuring said controller according to said selected device controller characteristics.

* * * * *